United States Patent [19]

Hunter et al.

[11] Patent Number: 4,654,378
[45] Date of Patent: Mar. 31, 1987

[54] PROCESS FOR THE MANUFACTURE OF HIGH SOLIDS, FREE-FLOWING, GRANULAR POLY(DIMETHYLDIALLYL AMMONIUM CHLORIDE)

[75] Inventors: Wood E. Hunter, Pittsburgh, Pa.; Gary P. Craun, Wickliffe, Ohio

[73] Assignee: Calgon Corporation, Pittsburgh, Pa.

[21] Appl. No.: 606,048

[22] Filed: May 2, 1984

[51] Int. Cl.$^4$ .......................... C08F 26/04; C08F 2/50
[52] U.S. Cl. .......................................... 522/3; 522/84; 522/85; 522/173; 522/903; 526/295; 525/261; 525/263; 525/292
[58] Field of Search ...................... 204/159.24, 159.23; 522/3, 903, 84, 85

[56] References Cited

U.S. PATENT DOCUMENTS

| | | | |
|---|---|---|---|
| 3,926,756 | 12/1975 | Restaino | 204/159.22 |
| 4,325,794 | 4/1982 | Hunter et al. | 204/159.23 |
| 4,415,417 | 11/1983 | Bush et al. | 204/159.24 |

*Primary Examiner*—John C. Bleutge
*Assistant Examiner*—A. H. Koeckert
*Attorney, Agent, or Firm*—W. C. Mitchell; R. B. Olson; M. C. Sudol, Jr.

[57] ABSTRACT

The instant invention is directed to a process for the manufacture of poly(dimethyldiallyl ammonium chloride) comprising:

(a) casting upon a continuous belt apparatus to form a film having a thickness of ¼ inch to 1 inch an aqueous dimethyldiallyl ammonium chloride solution having a monomer concentration of at least 65 percent, by weight, monomer, said monomer solution also containing a photoreducible dye in a concentration of $1 \times 10^{-7}$ to $1 \times 10^{-4}$ moles per liter, a mild reducing agent in a concentration of $1 \times 10^{-5}$ to $1 \times 10^{-2}$ moles per liter and thermal initiator in a concentration of $1 \times 10^{-5}$ to $1 \times 10^{-2}$ moles per liter;

(b) passing of the solution under a series of lights which emit visible light at an intensity of 0.1 to 10,000 foot candles and controlling the temperature of the monomer solution in the range of 5° C. to 65° C.;

(c) allowing the polymerization to proceed until a polymer gel is formed;

(d) reducing the size of the polymer gel of step (c) by a size reduction means, so as to produce polymer gel particles which are less than 1 inch in their longest dimension; and (e) further polymerizing the size-reduced polymer gel particles of step (d) to obtain higher conversion, thereby producing polydimethyldiallyl ammonium chloride gel particles which are at least 70 percent, by weight, active polymer, readily soluble and free-flowing.

The instant invention is further directed to free-flowing, water-soluble granules of poly(dimethyldiallyl ammonium chloride), wherein said granules contain at least 70 percent, by weight, active polymer.

8 Claims, No Drawings

PROCESS FOR THE MANUFACTURE OF HIGH SOLIDS, FREE-FLOWING, GRANULAR POLY(DIMETHYLDIALLYL AMMONIUM CHLORIDE)

BACKGROUND ON THE ART

This invention relates to a process for the manufacture of high solids, granular poly(dimethyldiallyl ammonium chloride) [hereinafter referred to as "poly(DMDAAC)"], which is free-flowing and highly soluble. Additionally, the poly(DMDAAC) prepared by this process has a high molecular weight and better performance characteristics than poly(DMDAAC) prepared by conventional solution polymerization techniques.

More particularly, the invention described herein is a continuous polymerization process for the preparation of improved poly(DMDAAC) which utilizes a combined visible light and thermal initiation system.

Many processes are known in the art for the preparation of water-soluble polymers. For example, water-soluble polymers have been prepared in solution, in suspension and in emulsion using chemical initiators. These processes, however, generally result in low conversion, low concentration of product and varying product quality. Additionally, various other polymerization processes have been proposed, as for example, photopolymerization processes such as those disclosed in U.S. Pat. Nos. 2,850,445; 2,880,152; 2,880,153; 4,306,955; 4,308,148; 4,325,794; 4,415,417; 4,252,625; 4,178,221; and 3,912,607 and high energy or radiation processes such as the one disclosed in U.S. Pat. No. 3,926,756.

The above referenced processes suffer from a variety of disadvantages, including high capital and manufacturing costs, low conversion, high energy requirements and low initial monomer concentration. Additionally, product forms such as emulsions, powders, dilute solutions and suspensions have inherent problems. For example, emulsification may deleteriously affect polymer performance, while oil and surfactant requirements keep manufacturing costs high. Powdered polymers are costly to produce due to the drying and milling steps required, and these operational steps may also degrade polymer quality. Dilute solutions of water-soluble polymers may be easy to handle, but are costly to transport due to their low active polymer content.

Accordingly, the need exists for a low cost method of preparing poly(DMDAAC) which can be easily and economically handled, and which has improved performance characteristics, high molecular weight, and high polymer concentration. Such an invention would satisfy a long felt need and constitute a notable advance in the art.

It is therefore an object of this invention to provide a process for the preparation of a high solids, granular form of poly(DMDAAC).

It is a further object of this invention to provide a process for the preparation of high solids, granular poly(DMDAAC) which reduces capital and operating costs.

It is a further object of this invention to provide a high solids, granular poly(DMDAAC) which is easy to handle, free-flowing, and highly soluble.

It is a still further object of this invention to provide a high solids, granular form of poly(DMDAAC) which has a higher molecular weight and better performance characteristics than poly(DMDAAC) prepared by conventional solution polymerization techniques.

These and other objects of this invention are accomplished by a process in which visible light is used to activate polymerization of a thin film, high solids dimethyldiallyl ammonium chloride (DMDAAC) monomer solution. This monomer solution may optionally contain not greater than 5 percent, by weight, of at least one additional water-soluble, ethlenically unsaturated monomer which is polymerizable with DMDAAC monomer. After polymerization commences, a thermal initiator is used to enhance the polymerization. When the exotherm raises the temperature of the polymerization system to a level sufficient to activate the thermal initiator, the light source may optionally be shut off. The reaction is then continued by the heat released from the polymerization process. This reduces the energy requirements of this process and permits higher conversion of monomer to polymer. Additionally, this allows the use of a smaller bank of lights when the manufacturing process is continuous.

A second aspect of this invention relates to a novel product form for poly(DMDAAC). The unique products made by the inventors' process are free-flowing, high molecular weight, high solids granules of poly(DMDAAC). These granules remain free-flowing and readily soluble after storage for extended periods of time.

DETAILED DESCRIPTION OF THE INVENTION

This invention relates to a process for the manufacture of poly(DMDAAC) comprising:
(a) casting upon a continuous belt apparatus to form a film having a thickness of $\frac{1}{4}$ inch to 1 inch an aqueous DMDAAC solution having a monomer concentration of at least 65 percent, by weight, monomer, said monomer solution also containing a photoreducible dye in a concentration of $1 \times 10^{-7}$ to $1 \times 10^{-4}$ moles per liter, a mild reducing agent in a concentration of $1 \times 10^{-5}$ to $1 \times 10^{-2}$ moles per liter and thermal initiator in a concentration of $1 \times 10^{-5}$ to $1 \times 10^{-2}$ moles per liter;
(b) passing the solution of step (a) under a series of lights which emit visible light at an intensity of 0.1 to 10,000 foot candles and controlling the temperature of the monomer solution in the range of 5° C. to 65° C.;
(c) allowing polymerization to proceed until a polymer gel is formed;
(d) reducing the size of the polymer gel of step (c) by a size reduction means, so as to produce polymer gel particles which are less than 1 inch in their longest dimension; and
(e) further polymerizing the size-reduced polymer gel particles of step (d) to obtain higher conversion, thereby producing poly(DMDAAC) gel particles which are at least 70 percent, by weight, active polymer, readily soluble in water and free-flowing.

The instant invention is also directed to free-flowing, water-soluble granules of poly(DMDAAC), wherein said granules contain at least 70 percent, by weight, active polymer.

Aqueous solutions of DMDAAC are prepared and fed to a polymerization apparatus at a concentration of at least 65 percent, by weight, monomer, preferably 70 percent to 95 percent, by weight, monomer. Optionally, these aqueous DMDAAC solutions may contain not greater than 5 percent, by weight, of a water-soluble ethlenically unsaturated monomer which is polymerizable with DMDAAC. Examples of such monomers include, but are not limited to, diethyldiallyl ammonium chloride (DEDAAC), methacryloyloxyethyl trimethyl ammonium methyl sulfate (METAMS), methacrylamido propyl trimethyl ammonium chloride (MAPTAC), acrylamide (AM), methacrylamide and N, N, dimethyl acrylamide. Polymers having molecular weights of at least 50,000, and preferably at least 1,000,000, as measured by intrinsic viscosity in a 1.0 N sodium chloride solution at 30° C., may be prepared by the process of this invention. A molecular weight of 1,000,000 corresponds to an intrinsic viscosity in a 1.0 N sodium chloride solution at 30° C. of approximately 1.5 dl/g. Chain transfer agents such as alcohols, mercaptans, and carboxylic acids can be added to the monomer solution to control the molecular weight of the polymer produced.

The polymerization process of this invention is initiated by a combination of visible light and one or more thermal initiators. Visible light may be defined as light having a wavelength in a range of approximately 4000 to 7000 Angstroms. Incandescent or fluorescent light sources may be used; preferably, a cool white fluorescent light source is used.

Accordingly any photoreducible dye and weak reducing agent may be used. Preferred photoreducible dyes include thiazines such as methylene blue, thionene, methylene green, isoalloxazines and riboflavin or phthaleins such as eosin and rhodamine B.

Suitable reducing agents include amines such as triethanolamine and ethylenediamine tetraacetic acid (EDTA), sucrose, ribose, dextrose, propylene glycol, glycerine, and sulfur compounds such as mercaptoacetic acid and sodium metabisulfite.

The preferred photo initiation systems are (1) a mixture of methylene blue and triethanolamine in a molar ratio of 0.0000025 to 1, preferably 0.0005 to 0.002, and (2) riboflavin, which contains the flavin dye and ribose reducing agent in the same molecule. The riboflavin cohcentration should be from $1 \times 10^{-7}$ to $1 \times 10^{-4}$ moles per liter of monomer solutions, if used as both the dye and reducing agent.

Suitable thermal initiators include inorganic free radical initiators such as ammonium persulfate, potassium persulfate, sodium persulfate, potassium peroxy dicarbonate and potassium peroxy diphosphate. The preferred thermal initiators are ammonium or potassium persulfate. The thermal initiator should be present in a concentration of from $1 \times 10^{-5}$ moles per liter to $1 \times 10^{-2}$ moles per liter of monomer solution, preferably from $1.0 \times 10^{-4}$ moles per liter to $1 \times 10^{-3}$ moles per liter. Use of a photo initiator with a thermal initiator eliminates the need for removing oxygen from the system, and enhances the polymerization rate once the polymerization has been initiated and the exotherm has raised the temperature of the partially polymerized reaction medium to a level sufficient to activate the thermal initiator. If desired, the lights can be turned off once the thermal initiator is activated. This combined initiation system reduces the energy requirements of manufacture and permits higher conversion of monomer to polymer. Additionally, the dual initiation system permits the use of a smaller bank of lights.

The polymerization process of the present invention is continuous and is preferably carried out on an apparatus comprising a continuous belt which is driven by two spaced apart rotating drums. The belt may be of any suitable material, including but not limited to stainless steel or plastic, and is preferably release coated with a suitable agent. Lights are positioned over the belt in such a manner so as to provide the desired light intensity to the monomer/initiator mixture which is fed, at the desired thickness, onto the surface of the belt. Cooling or heating water may be sprayed against the underside of the belt to control the reaction temperature and the belt speed may be varied to control the reaction time.

The polymerization process of the present invention does not require a nitrogen purge. It may be carried out in an oxygen-containing environment such as air or in the presence of an inert gas such as nitrogen or argon.

Suitable light intensities include those in the range of 0.1 to 10,000 foot candles, preferably 300 to 4000 foot candles, and may be supplied by any suitable source, as for example, incandescent floodlights or fluorescent lamps. Initiation temperatures should be in the range of 5° C. to 65° C., preferably 10° C. to 25° C., and film thickness should be in the range of ¼ inch to 1 inch, preferably ¼ inch to ½ inch, while reaction time should be in the range of 5 minutes to 120 minutes, preferably 40 minutes to 70 minutes, and pH should generally be in the range of 3 to 10, preferably 6.5 to 8.5.

The key to this process is the polymerization at higher solids levels, wherein solids level is defined as DMDAAC monomer plus inerts, such as NaCl. The process initially yields a solid or semi-solid product which is grindable. Conversion is controlled to facilitate grinding. Since poly(DMDAAC) at greater than 70 percent solids may be hard to handle, it is preferred to maintain a moderate conversion, say 20 to 70 percent solids, to facilitate grinding of a semi-solid particulate product. Thus, polymerization is preferably stopped when a polymer gel is formed. After grinding, the resulting granular poly(DMDAAC)'s further polymerized to a higher conversion level by suitable post-treatment steps.

Size reduction can be accomplished by any comminution means, including but not limited to grinding, milling, triturating, levigating, rasping, slicing, cutting, extruding, and flaking, which will produce polymer gel particles which are less than 1 inch in their longest dimension. Preferably, the size reduction means should produce polymer gel particles which are between 1/32 inch and ⅜ inch in their longest dimension. Although all of the polymers of the instant invention have excellent solubility in water, solubility improves as average particle size decreases. Therefore, it is most preferred that the size reduction means produce polymer granules which are between 1/16 inch and ¼ inches in their longest dimension. Further, the size reduction step should produce polymer gel particles which are uniform and discrete. A significant and surprising advantage of the instant process is that no additives must be employed to cause the particles to be or to stay free-flowing.

Post-treatment of the size-reduced gel is necessary to obtain high conversion. Since the ground gel is non-adhesive, it can be stirred or tumbled in any of several reactor designs while an inorganic free radical initator is added. Any inorganic free radical initiator can be used, and the initiator may be added in any desired fashion, though it is preferred that a concentrated aqueous solution containing the desired initiator be added over a 10 to 60 minute period. The preferred inorganic free radical initiator is selected from the group consisting of ammonium persulfate (APS), ammonium bisulfite, potassium persulfate and sodium persulfate. The inorganic free radical initiator dosage is 0.01 to 5 percent by weight active initiator, based on the weight of the gel particles. The most preferred method of obtaining higher conversion is to add an aqueous solution of APS to the size-reduced particles over a 10 to 60 minute period, so that the resulting dosage of active APS is 0.05 to 2.0 percent by weight, based on the weight of the gel particles, preferably 0.10 to 0.50 percent by weight of the gel particles.

Thus, it is possible by the instant process to produce free-flowing, water-soluble poly(DMDAAC) granules which are at least 70 percent, by weight, active polymer. Preferably, the poly (DMDAAC) granules of the instant invention are 75-95 percent, by weight, active polymer. Other processes for the manufacture of poly(DMDAAC) known in the art generally produce solutions of poly(DMDAAC) containing less than 70 percent solids. These products are then commonly diluted to 20 to 40 percent solids solutions. Thus, the novel product form produced by the instant process is higher in active solids than contemporary poly(DMDAAC) products. The product form disclosed herein is therefore cheaper to ship and easier to handle than the more dilute poly(DMDAAC) solutions common in the art. It is surprising and unexpected that polymers produced by the instant process are free-flowing, at solids loadings in excess of 75 percent, by weight. The products of this invention can be used in any water treatment applications where high molecular weight poly(DMDAAC) has been found to be effective, such as in municipal and industrial flocculation/coagulation systems.

EXAMPLE

The following example illustrates the present invention in greater detail. It should be understood that the invention is not in any way limited by this example.

A polymerization apparatus which comprised a laboratory photopolymerization hood was used to prepare poly(DMDAAC) by the instant process. Four cool white fluorescent lights, each 4 ft. in length, were installed in the hood at a distance 7 inches above the base, which resulted in a light intensity of 1200 foot candles. A seventy-one (71%) percent DMDAAC monomer solution (248 grams DMDAAC monomer and deionized water) was charged to a beaker. With agitation, 2 milliliters of riboflavin solution (0.0336 grams in 50 milliliters of deionized water), 0.1 gram ammonium persulfate and 0.2 gram of sodium salt of EDTA were added. The pH was adjusted to 6.5. This solution was transferred to a 7.3 inch wide/3.5 inch deep dish, placed under the fluorescent lights and the lights were turned on. Polymerization was allowed to occur for 1 hour at 50° C. Then polymerization was allowed to occur for an additional hour at 60° C. This 2 step laboratory procedure controlled the reaction exotherm. Conversion of DMDAAC monomer to polymer was 52 percent after the second hour. The resulting polymer gel was ground using a Kitchen-Aid meat grinder with a ⅜ inch die plate. The resulting gel particles were approximately ⅜" in their longest dimension. After grinding, the gel particles were post-treated by adding 4 milliliters of 25 percent ammonium persulfate (APS) solution; 0.5 milliliters per minute of the APS solution were added for 20 minutes, then the remaining solution was added over a period of 15 minutes. The resulting polymer contained less than 10 percent residual DMDAAC and consisted of free-flowing, particles. Analysis of these particles indicated that they were greater than 80 percent active polymer. The intrinsic viscosity, measured in 1 N NaCl at 30° C., was 2.5 dl/g. This corresponds to a molecular weight of approximately 2,900,000.

Upon storage for one year under ambient conditions, the gel retained its free-flowing particulate character. Dilution of the gel with water to give a 10 percent active polymer solution gave no insolubles and the dissolution time was 15 minutes using mild agitation.

What is claimed is:
1. A process for the manufacture of poly(dimethyldiallyl ammonium chloride) comprising:
    (a) casting upon a continuous belt apparatus to form a film having a thickness of ¼ inch to 1 inch an aqueous dimethyldiallyl ammonium chloride solution having a monomer concentration of at least 65 percent, by weight, monomer, said monomer solution also containing a photoreducible dye in a concentration of $1 \times 10^{-7}$ to $1 \times 10^{-4}$ moles per liter, a mild reducing agent in a concentration of $1 \times 10^{-5}$ to $1 \times 10^{-2}$ moles per liter and thermal initiator in a concentration of $1 \times 10^{-5}$ to $1 \times 10^{-2}$ moles per liter;
    (b) passing the solution of step (a) under a series of lights which emit visible light at an intensity of 0.1 to 10,000 foot candles and controlling the temperature of the monomer solution in the range of 5° C. to 65° C.;
    (c) allowing polymerization to proceed until a polymer gel is formed;
    (d) reducing the size of the polymer gel of step (c) by a size reduction means, so as to produce polymer gel particles which are less than 1 inch in their longest dimension; and
    (e) adding an inorganic free radical initiator selected from the group consisting of ammonium persulfate, ammonium bisulfite, potassium persulfate, sodium persulfate, potassium peroxy dicarbonate and potassium peroxy diphosphate, at a dosage of from 0.01 to 5%, by weight active initiator, based on the weight of the gel particles, to the size-reduced polymer gel particles of step (d), thereby further polymerizing the size-reduced polymer gel particles of step (d) to obtain higher conversion, and producing poly(DMDAAC) gel particles which are at least 70 percent, by weight, active polymer, readily soluble and free-flowing.
2. The process of claim 1, wherein the dye is selected from the group consisting of methylene blue, thionene, methylene green, riboflavin, isoalloxazines, eosin and rhodamine B.
3. The process of claim 1, wherein the reducing agent is selected from the group consisting of triethanolamine, ethylenediamine tetraacetic acid, ribose, sucrose, dextrose, sodium metabisulfite, mercaptoacetic acid, glycerine, and propylene glycol.
4. The process of claim 1, wherein the thermal initiator is selected from the group consisting of ammonium persulfate, potassium persulfate, sodium persulfate, potassium peroxy dicarbonate and potassium peroxy diphosphate.
5. The process of claim 1, wherein said aqueous dimethyldiallyl ammonium chloride solution further comprises not greater than 5 percent, by weight, of a water-soluble, ethylenically unsaturated monomer which is polymerizable with dimethyl diallylammonium chloride.

6. The process of claim 1, wherein the monomer concentration is 70 to 95 percent, by weight monomer.

7. The process of claim 1, wherein said lights emit visible light at an intensity of 300 to 4000 foot candles.

8. The process of claim 1, wherein the inorganic free radical initiator is ammonium persulfate and the dosage is 0.05 to 2.0 percent, by weight active initiator, based on the weight of the gel particles.

* * * * *